United States Patent [19]

Fujita et al.

[11] Patent Number: 5,118,748
[45] Date of Patent: Jun. 2, 1992

[54] PHENYLENE OXIDE POLYMER COMPOSITION

[75] Inventors: Toshinori Fujita; Takahiko Hirata, both of Hyogo, Japan

[73] Assignee: Mitsubishi Cable Industries Ltd., Hogyo, Japan

[21] Appl. No.: 489,989

[22] Filed: Mar. 7, 1990

[30] Foreign Application Priority Data

Mar. 7, 1989 [JP] Japan ............................ 1-54750
Dec. 27, 1989 [JP] Japan ............................ 1-344296

[51] Int. Cl.⁵ .......................... C08K 3/20; C08L 53/02
[52] U.S. Cl. ............................................ 524/436; 522/83; 522/111; 524/437; 525/92; 525/905
[58] Field of Search .................. 524/436, 437; 525/92, 525/905

[56] References Cited

U.S. PATENT DOCUMENTS 4,497,925  2/1985  Aboline et al. .................. 524/437
4,622,352  11/1986  Dijiaww ......................... 524/437

FOREIGN PATENT DOCUMENTS 0263678  of 0000  European Pat. Off.
0274029  of 0000  European Pat. Off.
0340415  of 0000  European Pat. Off.
2375293  of 0000  France

OTHER PUBLICATIONS

Patent Abstract of Japan, vol. 9, No. 233 Sep. 19, 1985 (Mitsubishi Gas K.K.K.).
Patent Abstract of Japan, vol. 6, No. 11 Jan. 22, 1982 (Engineering Plastics K.K.).
"Plastics and Rubber Processing and Applications", 11:45-51 (1989), P. R. Hornsby et al.

*Primary Examiner*—Jacob Ziegler
*Attorney, Agent, or Firm*—Sughrue, Mion, Zinn, Macpeak & Seas

[57] ABSTRACT

A phenylene oxide polymer composition comprising (1) a phenylene oxide polymer; (2) a styrene/ethylene butylene/styrene block copolymer; and (3) a hydrated metal oxide; wherein the ratio by weight of the phenylene oxide polymer to the styrene/ethylene butylene/styrene block copolymer ranges from 90:10 to 10:90 and the content of the hydrated metal oxide ranges from 50 to 300 parts by weight per 100 parts by weight of the total amount of the phenylene oxide polymer and styrene/ethylene butylene/styrene block copolymer. This composition shows a high fire retardancy and little fuming and is excellent in tensile strength, elongation, low-temperature brittleness and organic solvent resistance.

6 Claims, No Drawings

PHENYLENE OXIDE POLYMER COMPOSITION

FIELD OF THE INVENTION

This invention relates to a phenylene oxide polymer composition which has a high fire retardancy and thus is suitable as a wire coating material.

BACKGROUND OF THE INVENTION

A wire coating material should be fire retardant. Thus, compositions comprising fire retardant phenylene oxide polymers showing a high heat resistance have been used therefor. Furthermore, it has been proposed to blend such a phenylene oxide polymer with, for example, polyamide, nylon or polystyrene so as to improve its properties including high-impact strength, fire retardancy and chemical resistance.

Even such an improved phenylene oxide polymer composition as the one described above, however, shows a poor tensile elongation or flexibility. Furthermore, it has a low organic solvent resistance. When it is exposed to a sharp bend or an organic solvent, therefore, cracking might rapidly occur at room temperature. These facts indicate that these conventional phenylene oxide polymer compositions are unsatisfactory as a wire coating materials.

In order to solve the above-mentioned problems, there has been proposed a composition comprising a phenylene oxide polymer, a styrene/olefin/styrene block copolymer and a phosphorus fire retardant. A phosphorus fire retardant is generally in the form of a liquid at room temperature and has a plasticizing effect. Thus, the above-mentioned composition containing the phosphorus fire retardant is excellent in, for example, fire retardancy and mechanical properties. However it has been required to further improve said composition, since it shows serious fuming caused by the phosphorus fire retardant component.

On the other hand, a hydrated metal oxide is known as a fire retardant accompanied by little fuming. However it is required to use a large amount of a hydrated metal oxide in order to achieve a fire retardant effect as high as the one achieved by using the phosphorus fire retardant. As a result, the mechanical properties and low-temperature brittleness of the product are deteriorated.

SUMMARY OF THE INVENTION

Accordingly, it is an object of the present invention to provide a phenylene oxide polymer composition which shows little fuming, has a high fire retardancy and is excellent in tensile strength, elongation, low-temperature brittleness, electrical properties and organic solvent resistance.

The object of the present invention have been achieved by providing a phenylene oxide polymer composition comprising (1) a phenylene oxide polymer; (2) a styrene/ethylene butylene/styrene block copolymer; and (3) a hydrated metal oxide; wherein the ratio by weight of said phenylene oxide polymer to said styrene/ethylene butylene/styrene block copolymer ranges from 90:10 to 10:90 and the content of said hydrated metal oxide ranges from 50 to 300 parts by weight per 100 parts by weight of the total amount of said phenylene oxide polymer and styrene/ethylene butylene/styrene block copolymer.

DETAILED DESCRIPTION OF THE INVENTION

The phenylene oxide polymer to be used in the present invention is known as a polyphenylene oxide or a polyphenylene ether, and preferably is a homopolymer having repeating units represented by the following formula (I) or formulae (I) and (II):

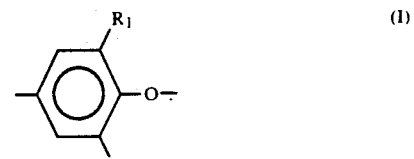

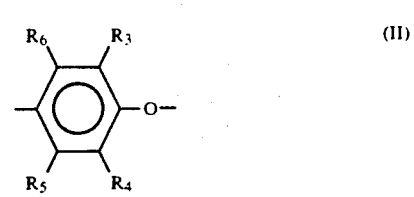

wherein $R_1$, $R_2$, $R_3$, $R_4$, $R_5$ and $R_6$, which may be the same or different, each represents a substituted or unsubstituted alkyl group having 1 to 4 carbon atoms provided that a tert-butyl group is excluded therefrom, an aryl group, a halogen atom or a hydrogen atom, etc., provided that $R_5$ and $R_6$ don't represent a hydrogen atom at the same time.

The specific examples of the phenylene oxide polymer include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether, poly(2-methyl-6-chloroethyl-1,4-phenylene)ether, etc.

The phenylene oxide polymer to be used in the present invention preferably has a number-average polymerization degree of 20 to 600, preferably 45 to 450. If the degree of polymerization is smaller than 20, the mechanical properties of the polymer composition are lowered. If it exceeds 600, the moldability is remarkably deteriorated.

The phenylene oxide polymer used in the present invention may be modified by various modifiers. The modifier may be used by simply mixing with the phenylene oxide polymer and may be used in the form of a graft copolymer with the phenylene oxide polymer.

Preferred examples of the modifiers are styrene series monomers, oligomers or polymers and more preferably a (co)polymer composed of at least one kind of monomer units represented by the following formula (III):

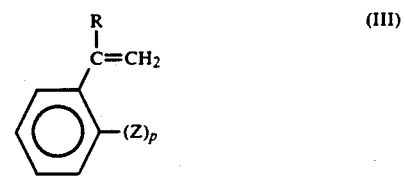

wherein R represents a hydrogen atom, an alkyl group having 1 to 20, particularly 1 to 10 carbon atoms or a halogen atom; Z represents an alkyl group having 1 to 20, particularly 1 to 10 carbon atoms, a hydrogen atom or a halogen atom; and p represents an integer of 1 to 5.

Specifically, those obtained by homopolymerizing or copolymerizing at least one monomer selected from styrene, α-methylstyrene, vinyltoluene, vinylethylbenzene, vinylxylene, p-methylstyrene, tert-butylstyrene, chlorostyrene, etc.

The specific examples of the modifier include polystyrene, polychlorostyrene, rubber modified polystyrene (impact-resistant polystyrene), styrene/acrylonitrile copolymer, styrene/butadiene copolymer, styrene/butadiene/acrylonitrile copolymer, and styrene/α-methylstyrene copolymer. Among these, impact-resistant polystyrene is preferably used and the impact-resistant polystyrene includes rubber modified polystyrene modified by elastomer such as butadiene rubber, butadiene/styrene copolymer rubber, and EPDM.

The content of the modifier in the phenylene oxide polymer is preferably 0.5 to 50 wt %, particularly preferably 1 to 20 wt %.

Examples of the styrene/ethylene butylene/styrene block copolymer to be used in the present invention are commercially available "Kraton G1650 ®" and "Kraton G1652 ®" (each a product of Shell Chemical Co., U.S.A.). It is preferable to use a styrene/ethylene butylene/styrene block copolymer having weight ratio of the styrene to the ethylene butylene of from 10/90 to 50/50 and a Shore A hardness of from 50 to 100, particularly 70 to 80.

Further, the styrene/ethylene butylene/styrene block copolymer preferably has viscosity of 200 to 2500 cps, particularly 500 to 1500 cps, at 25° C. in 20 wt % toluene solution. By using such a copolymer, a composition excellent in tensile strength, elongation, and low-temperature brittleness, etc., can be obtained even if the hydrated metal oxide is incorporated into the composition in a large amount. Further, the thus obtained composition is easily crosslinked, particularly by electron irradiation.

In the present invention, the phenylene oxide polymer (A) and the styrene/ethylene butylene/styrene block copolymer (B) are blended at an A/B ratio by weight of from 90/10 to 10/90. When the B component is smaller than 10 wt %, the desired effect described above can be hardly achieved. When the A component is smaller than 10 wt %, on the other hand, the excellent properties of the phenylene oxide polymer per se, e.g., fire retardancy and cut-through resistance at high temperature, are lowered. In this case, furthermore, the electron-ray irradiation-crosslinked product becomes rather too soft to be applied as a wire coating material. The A/B ratio preferably ranges from 80/20 to 20/80, still preferably from 75/25 to 25/75.

Examples of the hydrated metal oxide to be used in the present invention include magnesium hydroxide and aluminum hydroxide. It is preferable to use magnesium hydroxide. It is still preferable to use magnesium hydroxide which has been surface-treated with a fatty acid (for example, stearic acid, oleic acid, maleic acid) and a metal salt thereof, a coupling agent (for example, a silicone series coupling agent, a titanium series coupling agent), an organic polymer, an inorganic polymer, etc., to improve the water resistance, the carbon dioxide resistance and the acid resistance, etc. It is particularly preferable to use magnesium hydroxide having a high purity and a uniform particle size.

When the content of the hydrated metal oxide is excessively small, the fire retardant effect of the composition is limited. When it is excessively large, on the other hand, the composition is poor in tensile strength, elongation and low-temperature brittleness. Therefore the hydrated metal oxide should be employed in an amount of from 50 to 300 parts by weight, preferably from 100 to 200 parts by weight, per 100 parts by weight of the total amount of the phenylene oxide polymer and the styrene/ethylene butylene/styrene block copolymer. When the content of the hydrated metal oxide is smaller than 50 parts by weight, the obtained composition shows a poor fire retardant effect. When it exceeds 300 parts by weight, the composition is poor in tensile strength, elongation and low-temperature brittleness.

In the present invention, it is preferable that the composition further contains an ethylenic polymer so as to elevate the stability thereof. The ethylenic polymer includes polyethylenes (e.g., high-density polyethylene, low-density polyethylene, straight chain low-density polyethylene, super low-density polyethylene), and ethylene copolymers (e.g., an ethylene/vinyl acetate copolymer, an ethylene/methyl acrylate copolymer, an ethylene/ethyl acrylate copolymer, an ethylene/methyl methacrylate copolymer, an ethylene/vinyl acetate/styrene graft copolymer, an ethylene/ethyl acrylate/styrene graft copolymer, an ethylene/ethyl acrylate/maleic anhydride copolymer, an ethylene/maleic anhydride graft copolymer, an ethylene/methacrylate metal ion copolymer, an ethylene/propylene copolymer, and an ethylene/propylene/diene copolymer).

The content of comonomer in the above-mentioned ethylene copolymers, especially in ethylene/vinyl acetate copolymer, ethylene/methyl methacrylate copolymer, and styrene graft polymers may appropriately range from 15 to 45% by weight while the content of the graft styrene may appropriately range from 10 to 30% by weight.

Preferable examples of the ethylenic polymer include the ethylene/methyl methacrylate copolymer and the ethylene/vinyl acetate/styrene graft copolymer.

In the present invention, the ethylenic polymer may be preferably used in an amount of from 25 to 400 parts by weight, still preferably from 40 to 250 parts by weight, per 100 parts by weight of the styrene/ethylene butylene/styrene block copolymer.

Although the composition of the present invention can be used in practice in an uncrosslinked state, it is preferable to crosslink the composition so as to improve various properties thereof, for example, heat distortion resistance, solvent resistance, tensile strength, and elongation.

The composition of the present invention may be crosslinked by various methods (for example, electron irradiation or chemical crosslinking with the use of a crosslinking agent such as a peroxide). It is particularly preferable to crosslink the composition of the present invention by electron irradiation. In this case, the exposed dose of the electron rays may appropriately range from 10 to 50 Mrad, still preferably from 15 to 25 Mrad. It is preferable to use a crosslinking aid so as to further improve the heat distortion properties and tensile properties of the crosslinked composition.

As the crosslinking aid, a compound having at least two ethylenic unsaturated functional groups may be used. Examples thereof include trimethylolpropane trimethacrylate, ethylene glycol dimethacrylate, triethylene glycol dimethacrylate, tetraethylene glycol dimethacrylate, polyethylene glycol dimethacrylate, lauryl methacrylate, triallyl cyanurate, triallyl isocyanurate, diallyl phthalate, triallyl trimellitate, triallyl phosphate, diallyl itaconate, triallyl aconitate, diallyl fumarate, diallyl citraconate, tetraallyl o-silicic acid ester, tetraallyl oxyethane, N,N'-m-phenylenebismaleimide, phenylmaleimide, triacrylhexahydrotriazine cyanurate, pentaerythritol triacrylate, pentaerythritol tetraacrylate, 1,6-hexanediol diacrylate, ethylene glycol diacrylate, divinylbenzene, trivinylbenzene and 1,2-polybutadiene (m.w.:1000 to 5000). Among these compounds, trimethylolpropane trimethacrylate, triallyl isocyanurate, triallyl trimellitate and tetraallyloxyethane are particularly recommended.

The crosslinking aid, if employed, may be used in an amount of from approximately 0.1 to 10 parts by weight, in particular from 0.5 to 5.0 parts by weight, per 100 parts by weight of the total amount of the phenylene oxide polymer and the styrene/ethylene butylene/styrene block copolymer.

The composition of the present invention may further contain various additives, for example, carbon black (for example, acetylene black, Ketzen black, thermal black, furnace black), metallic fibers (for example, steel, copper), various antioxidants for improving heat resistance (for example, hindered phenol antioxidants, mercaptobenzimidazole compounds amines, quinolines, phosphorus compounds), copper-pollution inhibitors, various metal oxides (for example, zinc oxide, antimony oxide, titanium oxide, yttrium oxide, cesium oxide, molybdenum oxide, tungsten oxide, aluminum oxide, boron oxide, zirconium oxide, bismuth oxide, iron oxide, neodymium oxide, samarium oxide, dysprosium oxide, magnesium oxide), boric acid compounds (for example, zinc borate), macromolecular phosphorus fire retardants, and processing aids such as stearic acid or colorants, each in a commonly employed amount, if required.

The composition of the present invention may be obtained by mixing the components together. The obtained composition, which shows excellent extrusion properties, can be crosslinked by, for example, electron irradiation. Therefore it is available as a coating material for, e.g., an insulating layer or jacket layer of an insulated wire.

Now a typical process for the preparation of the composition of the present invention to be used as a wire coating material will be described.

The above-mentioned components were fed into a Henschel mixer and stirred at a high rate (1000 to 2000 rpm) while maintaining the inside of the mixer at 50 to 150° C. When the material is dried, it is fine extruded with a biaxial kneading extruder and then formulated into pellets with a pelletizer to thereby give a composition. This composition is then extruded at 270° to 300° C. to thereby obtain a wire.

To further illustrate the present invention, the following Examples and Comparative Examples will be given

EXAMPLES 1 TO 11 AND COMPARATIVE EXAMPLES 1 TO 8

Each composition as specified in the Table below was kneaded with a Brabender Plastomil (manufactured by Toyo Seiki K. K.) and then press-molded to thereby obtain a sheet of 0.40 mm in thickness. The both surfaces of the obtained sheet were irradiated with electron rays at a dose of 15 Mrad per face to thereby crosslink the same.

The tensile strength, elongation, cut-through resistance, horizontal fire retardancy, fuming, brittle temperature, aging life (at 200° C.), volume resistivity and organic solvent (acetone) resistance of each crosslinked sheet obtained in Examples 1 to 11 and Comparative Examples 1 to 8 were evaluated in the following manner.

The results are shown in Table.

Cut-through resistance

A 90° edge was placed and a load was applied to a test sheet in a thermostat at 125° C. according to UL standard 758 until the sheet was penetrated.

Horizontal fire retardancy, Fuming

A test sheet was horizontally placed. Then it was ignited to evaluate the fire retardancy according to UL standard 758. The burning duration of less than 15 seconds is good and that of 15 seconds or more is poor. Fuming was evaluated with the naked eye.

Aging life

A test sheet was continuously heated at 200° C., and the time when the elongation becomes 20% was measured.

Solvent resistance

A test sheet was immersed in acetone for 7 days and then taken out. It was bent in a V-shape and the occurrence of cracking was observed.

The tensile strength and the elongation were measured in accordance with ASTM D638.

The brittle temperature was measured in accordance with ASTM D746.

The volume resistivity was measured in accordance with ASTM D257.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| PPO-1 (*1) | 40 | 40 | 40 | 50 | 35 | 20 | 40 | — | — | 40 | 65 |
| PPO-2 (*2) | — | — | — | — | — | — | — | 40 | 40 | — | — |
| SEBS-1 (*3) | 60 | 60 | 60 | 50 | 65 | 80 | — | 60 | 45 | 45 | 35 |
| SEBS-2 (*4) | — | — | — | — | — | — | 60 | — | — | — | — |
| EMMA (*5) | — | — | — | — | — | — | — | — | 15 | — | — |
| EVAS (*6) | — | — | — | — | — | — | — | — | — | 15 | — |
| Magnesium hydroxide (*7) | 100 | 150 | 180 | 150 | 150 | 150 | 150 | 150 | 150 | 150 | 100 |
| Antioxidant (*8) | 3 | 3 | 3 | 3 | 3 | 3 | 3 | 3 | 3 | 3 | 3 |
| Crosslinking aid (*9) | 2 | 2 | 2 | 2 | 2 | 2 | 2 | 2 | 2 | 2 | 2 |
| Tensile strength (kg/mm²) | 1.88 | 1.66 | 1.42 | 2.07 | 1.54 | 1.10 | 1.42 | 1.0 | 1.40 | 1.40 | 2.60 |
| Elongation (%) | 82 | 100 | 110 | 70 | 137 | 193 | 107 | 162 | 90 | 85 | 80 |
| Cut-through resistance 125° C. (g) | >900 | >900 | >900 | >900 | >900 | 790 | 670 | 510 | >900 | >900 | 570 |
| Horizontal fire retardancy | good | good | good | good | good | good | good | good | good | good | good |
| Fuming | little | little | little | little | little | little | little | little | little | little | little |
| Brittle temp. (°C.) | <−50 | <−30 | <−30 | <−30 | <−30 | <−30 | <−30 | <−30 | <−10 | <−10 | <−30 |
| Aging life 200° C. (hr.) | 30 | 28 | 15 | 18 | 32 | 23 | 20 | 49 | 12 | 15 | 13 |
| Volume resistivity (Ω·cm) | 10¹⁶ | 10¹⁵ | 10¹⁵ | 10¹⁵ | 10¹⁵ | 10¹⁵ | 10¹⁵ | 10¹⁵ | 10¹⁴ | 10¹⁴ | 10¹⁵ |
| Solvent resistance (immersed in acetone) | good | good | good | good | good | good | good | good | good | good | good |

| | Comparative Example | | | | | | | |
|---|---|---|---|---|---|---|---|---|
| | 1 | 2 | 3 | 4 | 5 | 6 | 7 | 8 |
| PPO-1 (*1) | 100 | 40 | 40 | 40 | 40 | 40 | 40 | 40 |
| SBS-1 (*11) | — | 60 | — | — | — | — | — | 60 |
| SBS-2 (*12) | — | — | 60 | — | — | — | — | — |
| SBS-3 (*13) | — | — | — | 60 | — | — | — | — |
| SIS-1 (*14) | — | — | — | — | 60 | — | — | — |
| SIS-2 (*15) | — | — | — | — | — | 60 | — | — |
| SEP (*16) | — | — | — | — | — | — | 60 | — |
| Magnesium hydroxide (*7) | 100 | 150 | 150 | 150 | 150 | 150 | 150 | 150 |
| Antioxidant (*8) | 3 | 3 | 3 | 3 | 3 | 3 | 3 | 3 |
| Crosslinking Aid (*9) | 2 | 2 | 2 | 2 | 2 | 2 | 2 | 2 |
| Phosphorous fire retardant (*10) | — | — | — | — | — | — | — | 30 |
| Tensile strength (kg/mm²) | 0 | 2.30 | 2.15 | 2.38 | 0.42 | 0.34 | 1.51 | 2.01 |
| Elongation (%) | 0 | 12 | 6 | 6 | 0 | 0 | 0 | 79 |
| Cut-through resistance 125° C. (g) | — | >900 | >900 | >900 | 360 | 357 | >900 | >900 |
| Horizontal fire retardancy | good | good | good | good | good | good | good | good |
| Fuming | little | little | little | little | little | little | little | much |
| Brittle temp. (°C.) | 20 | 20 | 20 | 20 | 20 | 20 | 20 | 20 |
| Aging life 200° C. (hr.) | 10¹⁵ | — | — | — | — | 49 | — | — |
| Volume resistivity (Ω·cm) | 10¹⁵ | 10¹⁵ | 10¹⁵ | 10¹⁵ | 10¹⁵ | 10¹⁵ | 10¹⁵ | 10¹⁵ |
| Solvent resistance | — | — | — | — | — | — | — | — |

TABLE 1-continued (immersed in acetone)

(*1): 2,6-dimethyl phenylene oxide polymer
(*2): 2,6-dimethyl phenylene oxide polymer modified with 25 wt % of high impact polystyrene
(*3): styrene/ethylene butylene/styrene block copolymer, (Kraton G 1650 ®, Shell Chemical Co.; styrene/ethylene and butylene ratio: 29/71 (% by weight); viscosity of solution: 1500 cps at 25° C.)
(*4): styrene/ethylene butylene/styrene block copolymer, (Kraton G 1652 ®, Shell Chemical Co.; styrene/ethylene and butylene ratio: 29/71 (% by weight); viscosity of solution: 550 cps at 25° C.)
(*5): ethylene/methyl methacrylate copolymer, (Acryft CM1005 ®, Sumitomo Chemical Co., Ltd.; methyl methacrylate content: 21% by weight, MI 0.6)
(*6): ethylene/vinyl acetate/styrene graft copolymer, (vinyl acetate content: 33 wt %; styrene content: 20 wt %)
(*7): Kisuma 5B-N ®, (Kyowa Chemical Co., Ltd.)
(*8): MARK AO-60 ®, (Adeka-Argus Chemical Co.)
(*9): TAIC ®, (Nippon Kasei Chemical Co.; triallyl isocyanurate)
(*10): triphenylphosphate
(*11): styrene/butadiene/styrene block copolymer, (Cariflex TR1101 ®, Shell Chemical Co.; styrene/butadiene ratio: 30/70 (% by weight); viscosity of solution: 4000 cps at 25° C.)
(*12): styrene/butadiene/styrene block copolymer, ((Cariflex TRKX-65S ®, Shell Chemical Co.; styrene/butadiene ratio: 28/72 (% by weight); viscosity of solution: 1200 cps at 25° C.)
(*13): styrene/butadiene/styrene block copolymer, (Kraton D1300X ®, Shell Chemical Co.; styrene/butadiene ratio: 17/83 (% by weight); viscosity of solution: 6000 cps at 25° C.)
(*14): styrene/isoprene/styrene block copolymer, (Kraton D1320X ®, Shell Chemical Co.; styrene/isoprene ratio: 10/90 (% by weight); viscosity of solution: 2500 cps at 25° C.)
(*15): styrene/isoprene/styrene block copolymer, (Cariflex TR1107 ®, Shell Chemical Co.; styrene/isoprene ratio: 14/86 (% by weight); viscosity of solution: 1600 cps at 25° C.)
(*16): styrene/ethylene/propylene block copolymer, (Kraton G1701X ® Shell Chemical Co.; styrene/ethylene and propylene ratio: 37/63 (% by weight); viscosity of solution: 1260 cps at 25° C.)

Aging life and solvent resistance were not measured for comparative examples due to the low elongation.

As shown in Table 1, the phenylene oxide polymer compositions in Examples 1 to 11 show satisfactory results in all of the properties, i.e., fire retardancy, fuming, tensile strength, elongation, low-temperature brittleness and organic solvent resistance, etc., as compared to the compositions in Comparative Examples 1 to 8.

While the invention has been described in detail and with reference to specific embodiments thereof, it will be apparent to one skilled in the art that various changes and modifications can be made therein without departing from the spirit and scope thereof.

What is claimed is:

1. A phenylene oxide polymer composition comprising (1) a phenylene oxide polymer; (2) a styrene/ethylene butylene/styrene block copolymer; and (3) a hydrated metal oxide; wherein the ratio by weight of said phenylene oxide polymer to said styrene/ethylene butylene/styrene block copolymer ranges from 90:10 to 10:90 and the content of said hydrated metal oxide ranges from 50 to 300 parts by weight per 100 parts by weight of the total amount of said phenylene oxide polymer and styrene/ethylene butylene/styrene block copolymer.

2. A phenylene oxide polymer composition as claimed in claim 1, which further comprises an ethylenic polymer in an amount of from 25 to 400 parts by weight per 100 parts by weight of said styrene/ethylene butylene/styrene block copolymer.

3. A phenylene oxide polymer composition as claimed in claim 1, wherein said phenylene oxide polymer and said styrene/ethylene butylene/styrene block copolymer are blended at a ratio by weight of from 75/25 to 25/75.

4. A phenylene oxide polymer composition as claimed in claim 1, wherein said hydrated metal oxide is magnesium hydroxide.

5. A phenylene oxide polymer composition as claimed in claim 1, which further comprises a crosslinking aid in an amount of from approximately 0.1 to 10 parts by weight per 100 parts by weight of the total amount of said phenylene oxide polymer and said styrene/ethylene butylene/styrene block copolymer and is crosslinked by electron irradiation.

6. A phenylene oxide polymer composition as claimed in claim 1, wherein said crosslinking aid is trimethylolpropane trimethacrylate, triallyl isocyanurate, triallyl trimellitate or tetraallyloxyethane.

* * * * *